United States Patent
Yang et al.

(10) Patent No.: US 8,188,627 B2
(45) Date of Patent: May 29, 2012

(54) TEMPERATURE PROTECTION DEVICE FOR BRUSHLESS DC MOTOR

(75) Inventors: Decong Yang, Guangdong (CN); Zewei Rao, Guangdong (CN); Hanzhong Zhou, Guangdong (CN); Zhengnan Zeng, Guangdong (CN); Shufeng Shi, Guangdong (CN); Hitoshi Taya, Aichi (JP)

(73) Assignees: Panasonic Corporation, Osaka (JP); Panasonic Ecology Systems Guangdong Co., Ltd., Guangdong (CN)

( * ) Notice: Subject to any disclaimer, the term of this patent is extended or adjusted under 35 U.S.C. 154(b) by 277 days.

(21) Appl. No.: 12/245,329

(22) Filed: Oct. 3, 2008

(65) Prior Publication Data

US 2009/0091218 A1 Apr. 9, 2009

Related U.S. Application Data

(63) Continuation-in-part of application No. PCT/CN2008/000705, filed on Apr. 7, 2008.

(30) Foreign Application Priority Data

Apr. 4, 2007 (CN) .......................... 2007 1 0092019
Aug. 13, 2007 (CN) .......................... 2007 1 0141173

(51) Int. Cl.
*H02K 11/00* (2006.01)

(52) U.S. Cl. ..... 310/68 C; 310/43; 310/68 B; 310/68 R; 310/89; 337/142; 337/227; 337/228; 337/231

(58) Field of Classification Search .................. 337/227, 337/228, 231; 310/43, 89, 68 B, 68 C; *H02K 11/00*
See application file for complete search history.

(56) References Cited

U.S. PATENT DOCUMENTS

| 1,601,673 | A | * | 9/1926 | Bridgman ...................... 337/192 |
| 2,662,953 | A | * | 12/1953 | Barker .......................... 337/187 |
| 2,816,193 | A | * | 12/1957 | Pine .............................. 337/187 |
| 2,946,203 | A | * | 7/1960 | Carver ........................... 62/230 |
| 3,243,550 | A | * | 3/1966 | Hollins ........................ 337/195 |
| 3,875,438 | A | * | 4/1975 | Tharman .................... 310/68 R |
| 4,208,621 | A | * | 6/1980 | Hipkins et al. .......... 318/400.21 |
| 4,237,440 | A | * | 12/1980 | Miyasaka et al. ............ 337/227 |
| 4,553,075 | A | * | 11/1985 | Brown et al. ............ 318/400.01 |
| 4,608,548 | A | * | 8/1986 | Borzoni ....................... 337/201 |
| 4,656,553 | A | * | 4/1987 | Brown ........................... 361/31 |
| 4,789,361 | A | * | 12/1988 | Kinzalow et al. ........ 439/620.29 |

(Continued)

FOREIGN PATENT DOCUMENTS

GB 2249441 5/1992

(Continued)

OTHER PUBLICATIONS wikipedia, "list of thermal conductivities", wikipedia.com, Jul. 2008.*

(Continued)

*Primary Examiner* — John K Kim
(74) *Attorney, Agent, or Firm* — RatnerPrestia (57) ABSTRACT

A temperature protection device for a brushless DC Motor, wherein a thermal fusing type protector is provided at a depression formed on a casing of the plastic-packaged brushless DC Motor. In this way, the thermal fusing type protector can be provided conveniently at a position where the casing temperature is highest after plastic packaging, and if the protector is fused due to high temperature, it can be replaced easily.

16 Claims, 9 Drawing Sheets

U.S. PATENT DOCUMENTS

| | | | | |
|---|---|---|---|---|
| 4,851,805 | A | * | 7/1989 | Poerschke .................... 337/231 |
| 5,130,688 | A | * | 7/1992 | Van Rietschoten et al. .. 337/231 |
| 5,146,763 | A | * | 9/1992 | Cummings et al. .......... 62/228.1 |
| 5,162,773 | A | * | 11/1992 | Shiozaki ....................... 337/201 |
| 5,901,045 | A | * | 5/1999 | Bencivenga et al. ......... 361/760 |
| 5,925,280 | A | * | 7/1999 | Lee ............................... 219/723 |
| 5,947,691 | A | * | 9/1999 | Brown et al. ................ 417/44.1 |
| 6,297,572 | B1 | * | 10/2001 | Sunaga et al. .............. 310/68 R |
| 6,731,082 | B2 | * | 5/2004 | Pelonis .................... 318/400.26 |
| 6,737,770 | B2 | * | 5/2004 | Sunaga et al. ............. 310/68 C |
| 6,930,585 | B2 | * | 8/2005 | Kawazoe ...................... 337/186 |
| 6,933,638 | B2 | * | 8/2005 | Hirth .............................. 310/71 |
| 2001/0033111 | A1 | * | 10/2001 | Choi ............................... 310/43 |
| 2004/0004453 | A1 | * | 1/2004 | Junnan et al. ................. 318/254 |
| 2006/0097704 | A1 | * | 5/2006 | Deverall et al. .............. 323/201 |
| 2006/0220474 | A1 | * | 10/2006 | Yoshida .......................... 310/43 |
| 2007/0210656 | A1 | * | 9/2007 | Lafontaine et al. ............ 310/58 |
| 2009/0091218 | A1 | * | 4/2009 | Yang et al. ................... 310/68 C |
| 2009/0261451 | A1 | * | 10/2009 | Whitney ....................... 257/530 |

FOREIGN PATENT DOCUMENTS

| | | |
|---|---|---|
| JP | 1-136585 | 5/1989 |
| JP | 2-151242 | 6/1990 |
| JP | 3-18246 | 1/1991 |
| JP | 2004104868 | 4/2004 |

OTHER PUBLICATIONS

Professional plastics, "Thermal Properties of Plastic Materials", Professional Plastic Company, Dec. 2011.*

International Search Report dated Jun. 28, 2008.

* cited by examiner fig. 1 PRIOR ART fig. 2 PRIOR ART fig. 3 fig. 4 fig. 5A fig. 5B fig. 5C fig. 5D fig. 7 fig. 8

TEMPERATURE PROTECTION DEVICE FOR BRUSHLESS DC MOTOR

CROSS-REFERENCE TO RELATED APPLICATION

This application is a continuation-in-part of PCT Application No. PCT/CN2008/000705, the contents of which are incorporated in this application by reference.

FIELD OF THE INVENTION

This invention relates to a brushless DC motor, and in particular, to a temperature protection device for a brushless DC motor.

BACKGROUND OF THE INVENTION

Figure 1:
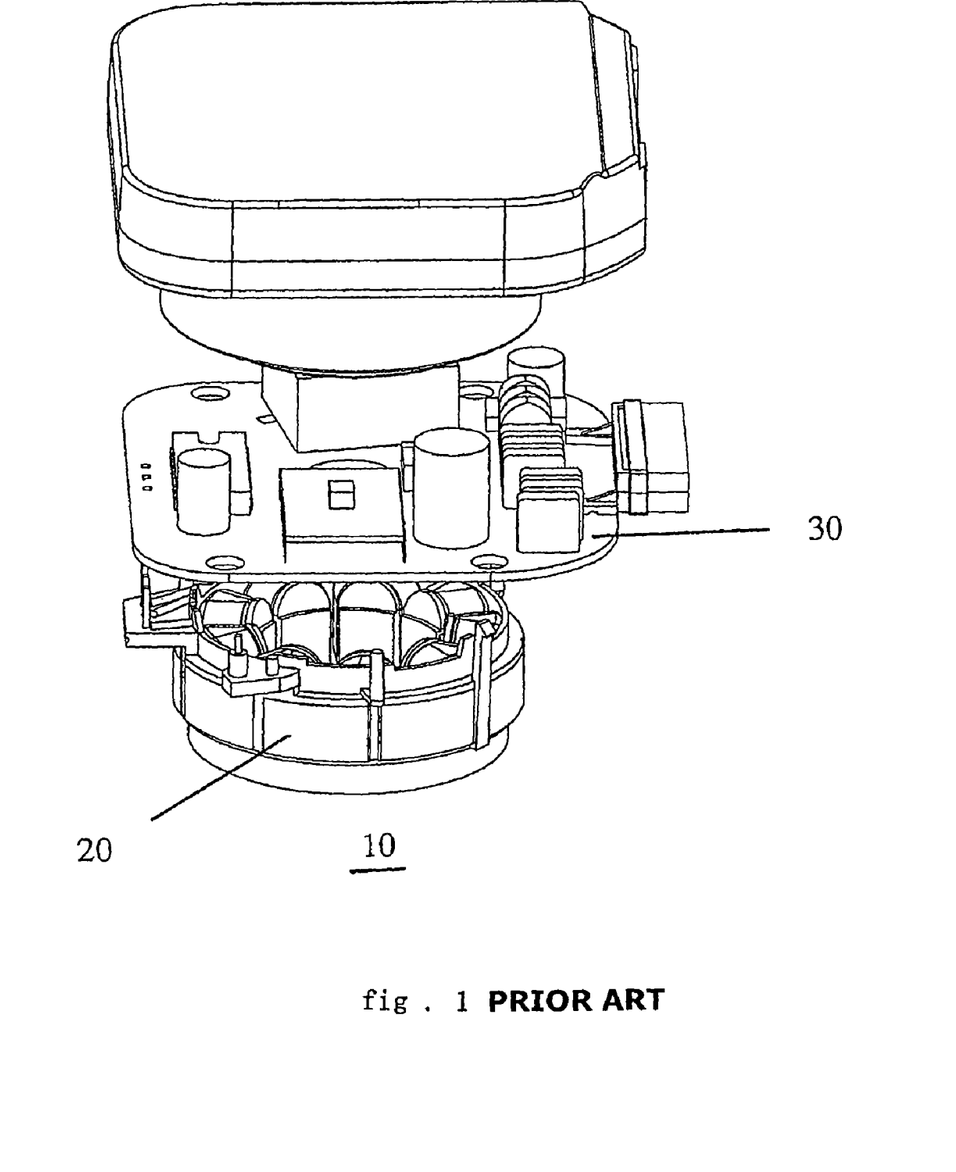
FIG. 1 is a schematic view of a prior art.

In the known brushless DC motor, as shown in FIG. 1, a substrate 30 having a circuit board is provided beside a stator 20 of the motor 10 for driving the movement of the motor by driving the rotation of the rotor. The substrate and the stator of the motor are integrally formed by plastic packaging. Further, although there are many cases in which the protector is used as a temperature protection device when the temperature is increased due to abnormal operation of the motor, the temperature that may be protected is less than 120 Celsius degree. For that reason, the temperature protector inside the plastic package may not be provided as a fusing type rather than an automatic restorable type.

Figure 2:
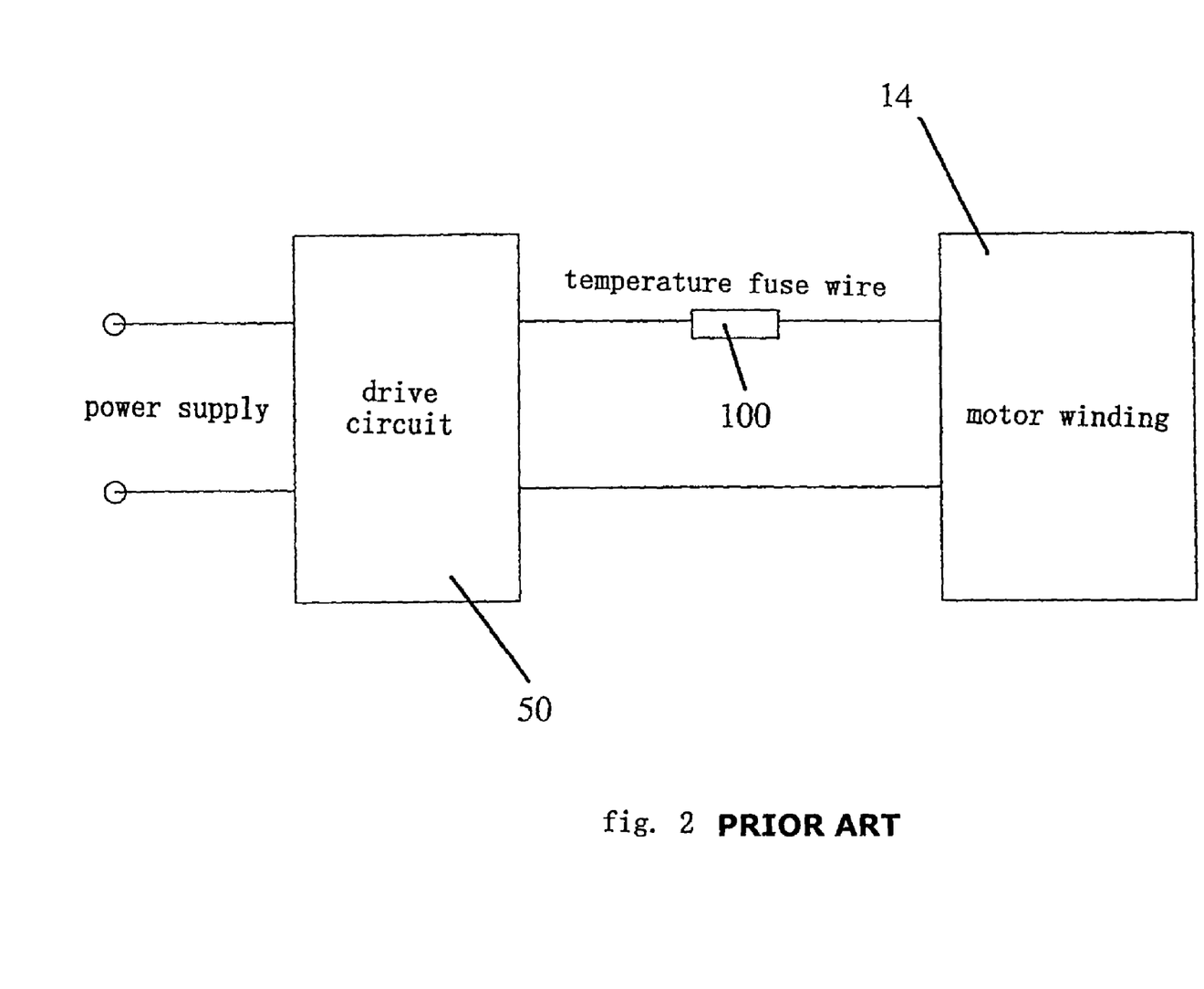
FIG. 2 is a schematic view of the drive circuit of the temperature fuse wire of the prior art.

As shown in FIG. 2, a conventional temperature fuse wire 100 is received between the coils of the motor winding 14. In principle, the temperature fuse wire 100 is provided after the drive circuit 50. When the temperature fuse wire 100 detects that the temperature of the motor winding 14 exceed the normal temperature, the temperature fuse wire 100 is activated to turn off the power supply of the motor winding 14 so as to protect the motor. However, the control circuit does not turn off the drive circuit 50 from the power supply, that is, the drive circuit 50 is not protected.

The present invention is provided to solve the above problem. The present invention provides a temperature protection device for a brushless DC motor wherein a thermal fusing type protector is mounted on the circumference of the motor formed by plastic-packaging, that is, the temperature fuse wire is mounted at a predetermined position so that it can turn off the power supply to both the motor winding and the drive circuit accurately.

SUMMARY OF THE INVENTION

The primary object of the present invention is to provide a temperature protection device for a brushless DC motor so that the brushless DC motor can have better stability.

The other object of the present invention is to provide a temperature protection device for a brushless DC motor which has a better performance in detecting the temperature.

In order to achieve the above objects, the present invention provides a temperature protection device for a brushless DC motor wherein a thermal fusing type protector is provided at a depression formed on a casing of the plastic-packaged brushless DC Motor.

The depression is at a position where an element in the drive circuit on the substrate, such as a driving IC, FET, or the resistor, which has a lower height, is positioned.

The thermal fusing type protector comprises a temperature fuse wire and a fixed cover having a groove in the center thereof, and the temperature fuse wire is imbedded into the groove. The temperature fuse wire is fixed on the casing of the motor via the fixed cover.

A projection is formed in the groove of the fixed cover for abutting against the temperature fuse wire to keep it in contact with the casing of the motor throughout.

An opening is formed in the groove of the fixed cover, and the fuse wire is provided with a positioning device passing through the opening.

The wire outlet of the groove is expanded in the outward direction.

An opening hole is provided at the side of the wire outlet of the groove for fitting with a boss on the casing of the motor, and a second wire outlet is provided at a side of the opening hole.

A strengthening rib is provided besides the opening hole for fitting with the boss on the casing of the motor.

The second wire outlet is arc-shaped.

A hook portion is provided at the edge of the opening of the second wire outlet.

A recess is formed at the depression, and the thermal fusing type protector comprises a temperature fuse wire and a fixed cover. The fixed cover fitted with the fuse wire is embedded in the recess.

An opening is provided in the groove of the fixed cover, and a positioning device is provided at an outer layer of the temperature fuse wire. The positioning device passes through the opening for fixing the temperature fuse wire on the casing of the motor.

A protection cover is provided on the fixed cover.

The thermal fusing type protector in the circuit of the brushless DC motor is connected to the power supply to both the drive circuit and the motor winding, and when the thermal fusing type protector is fused, the power supply to both the drive circuit and the motor winding is turned off.

In the temperature protection device for a brushless DC motor, a temperature protection module is provided in the circuit of the brushless DC motor, and when the thermal fusing type protector detects an abnormal variation in the temperature of the motor, the power supply to both the motor winding and the drive circuit is turned off.

In the temperature protection device for a brushless DC motor, a function module for detecting the number of revolutions is provided in the circuit of the brushless DC motor, and when the brushless DC motor is in a locked state or idling without a fan, the power output to the motor winding from the drive circuit is reduced to restrain the increase in temperature of the motor winding for preventing the thermal fusing type protector from turning off.

In the temperature protection device for a brushless DC motor, a circuit detection module for detecting the circuit in the motor winding and a voltage detection module for detecting the voltage of the motor winding are provided in the circuit of the brushless DC motor, and when the motor is in a locked state or idling without a fan, the power output to the motor winding from the drive circuit is reduced to restrain the increase in temperature of the motor winding for preventing the thermal fusing type protector from turning off.

An advantage of the present invention is that the thermal fusing type protector can be provided conveniently at a position where the casing temperature is highest after plastic packaging, and if the protector is fused due to high temperature, it can be replaced easily. In this way, the brushless DC motor will have better stability, and the product using the motor can also be protected.

DETAILED DESCRIPTION OF PREFERRED EMBODIMENTS OF THE INVENTION

Figure 3:
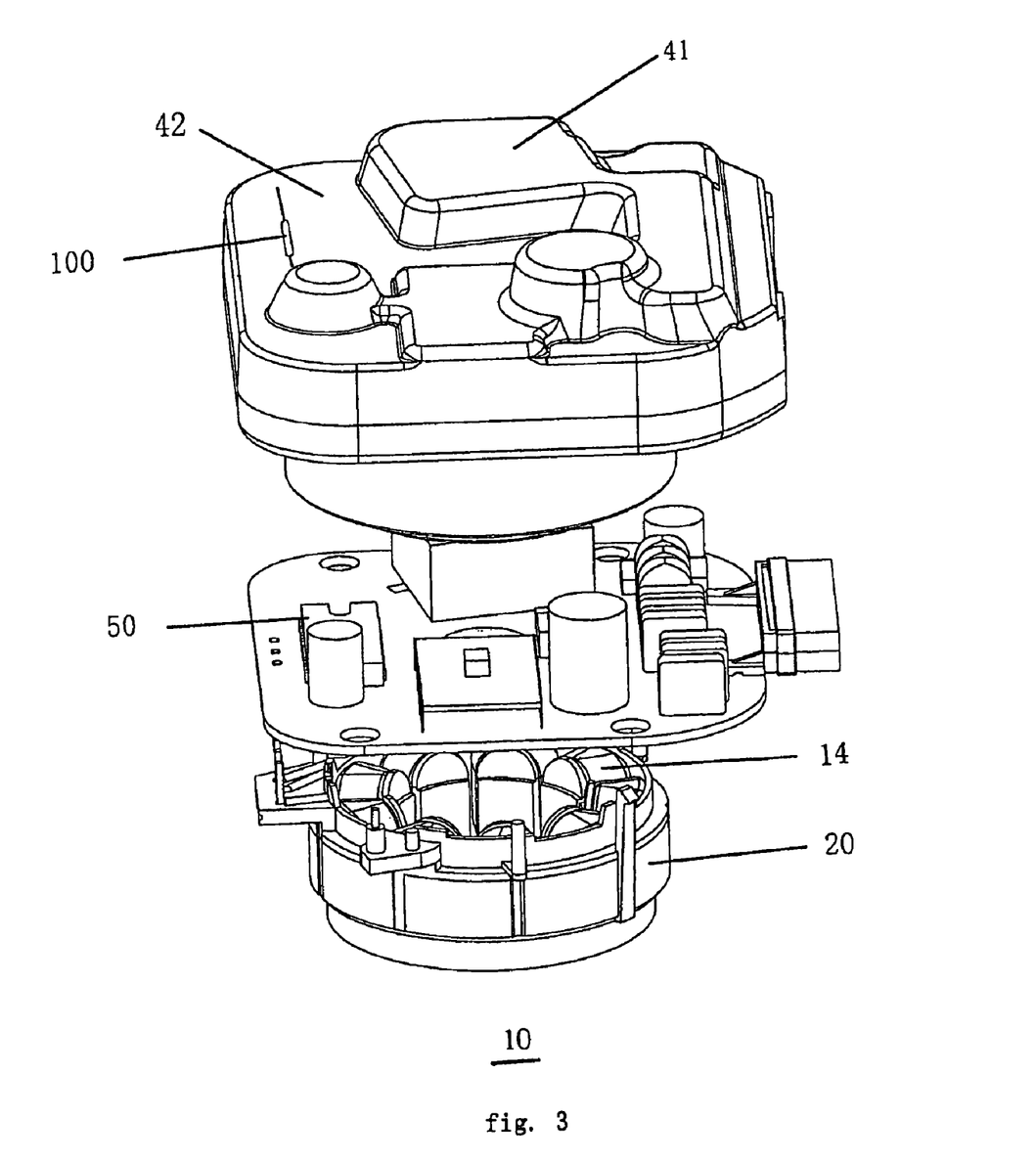
FIG. 3 is a schematic view according to a first embodiment of the present invention.

FIG. 3 is a schematic view according to the first embodiment of the present invention. A brushless DC motor 10 comprises a motor winding 14 and a drive circuit 50 for inputting current to the motor winding 14. The brushless DC motor 10 is covered with resin material entirely. That is, the drive circuit 50 of the brushless DC motor 10 is plastic-packaged in the casing of the brushless DC motor 10. Since the elements on the drive circuit 50 have different heights, when the motor is plastic-packaged, the outer surface of the motor 10 has inconsistent height. Therefore, when positioning the elements constituting the drive control circuit on a substrate, such elements having lower height as a driving IC, FET, resistor and the like are brought together so that they can form a depression 42 to have a larger area then that needed for mounting a thermal fusing type protector 100, while the rest portion forms a boss 41. According to the present invention, the thermal fusing type protector 100 is disposed at the depression 42 having a lowest height such that the thermal fusing type protector 100 is located closer to the heat generation portion inside the motor 10 and can sense the variation in temperature more efficiently. Therefore, when an abnormal temperature is occurred in the brushless DC motor 10, the thermal fusing type protector 100 can act quickly and efficiently, so that the stability of the product can be guaranteed.

Figure 4:
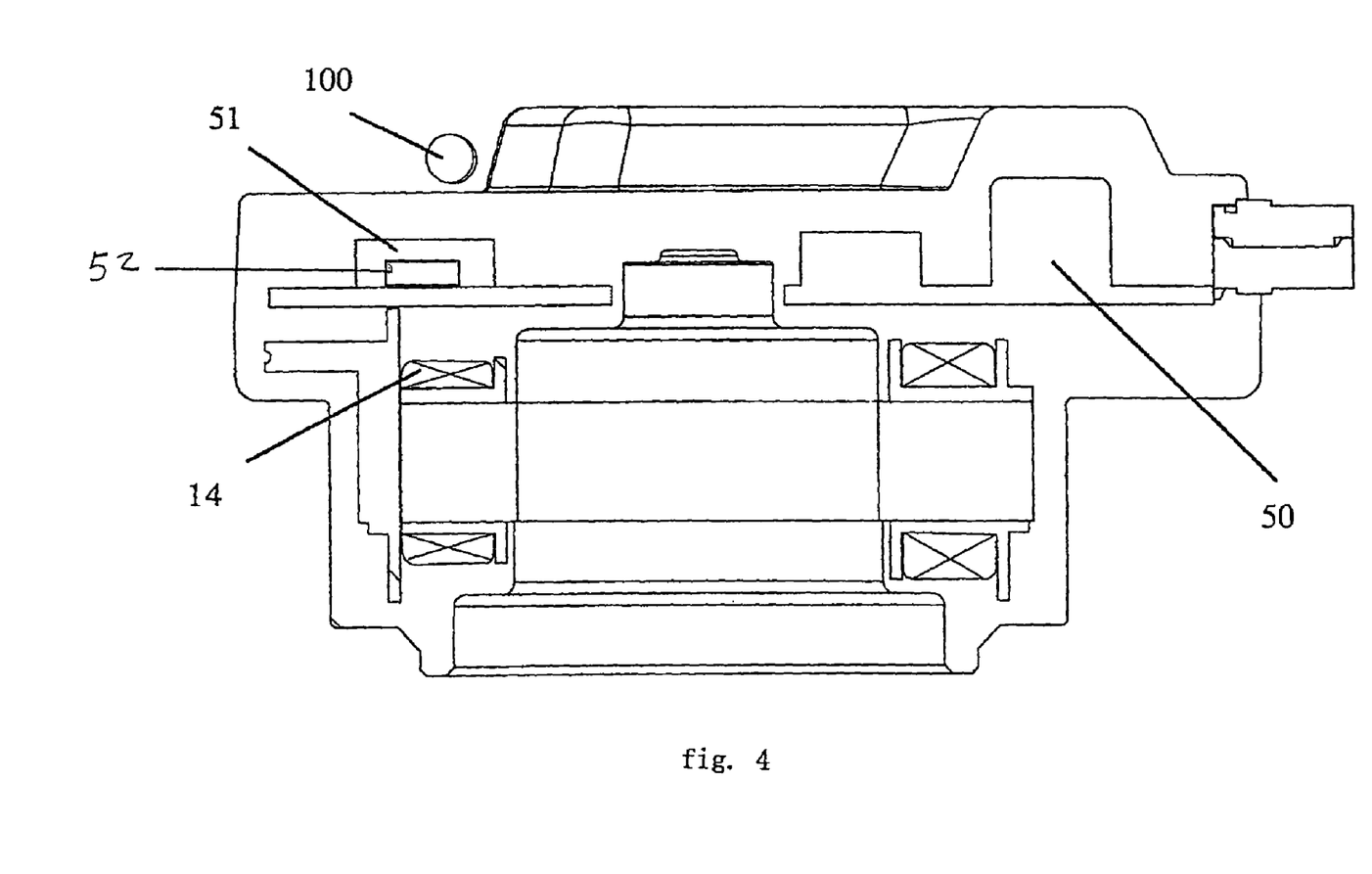
FIG. 4 is a sectional view along the line A-A in FIG. 3.

As shown in FIG. 4, there is a larger area where the casing height of the brushless DC motor 10 is lowest. However, considering the various elements in the drive circuit generate different amount of heat, in order to sense the variation in temperature of the drive circuit more efficiently, as shown in FIG. 4, the thermal fusing type protector 100 of the present invention is disposed above the driving IC 51 which generates most heat in the drive circuit 50. In this way, the variation of the temperature of the drive circuit can be sensed more efficiently.

Figure 5A:
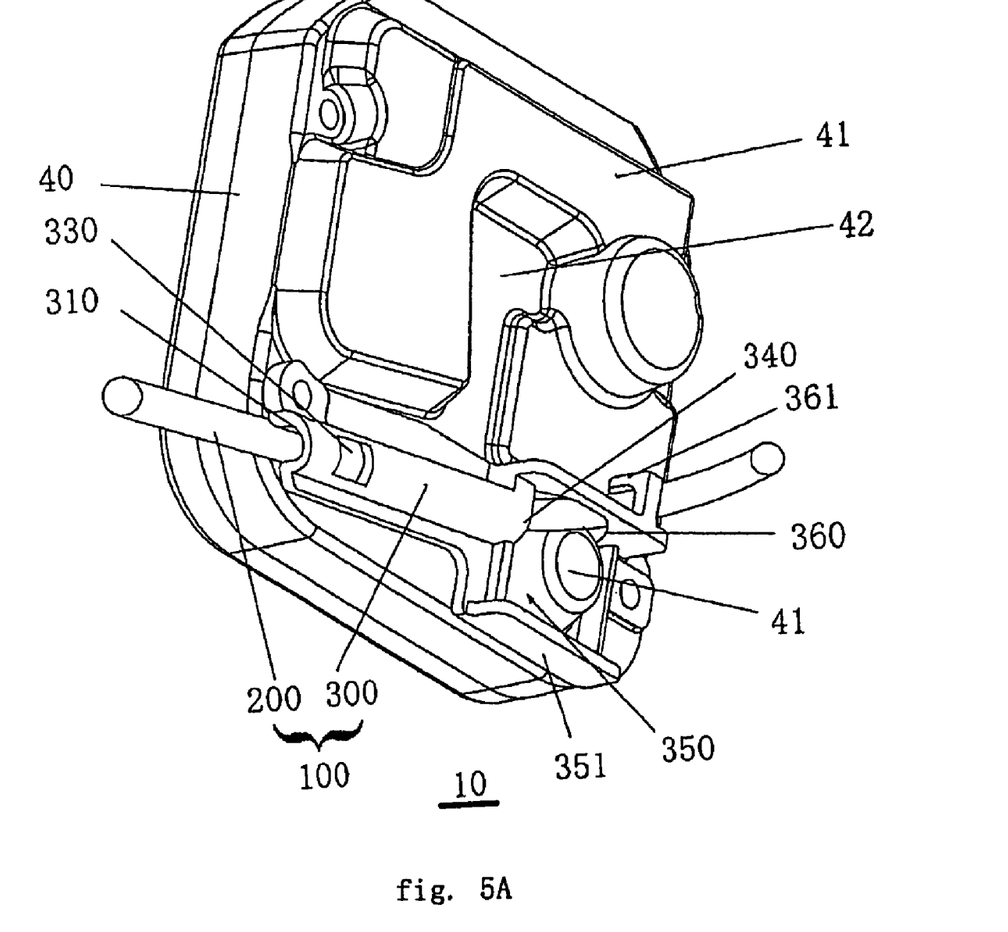
FIG. 5A is a mounting schematic view of the fusing type protector according to the first embodiment of the present invention.

FIG. 5A is a mounting schematic view of the protector according to the first embodiment of the present invention.

The boss 41 and the recess 42 are formed on the casing 40 of the plastic-packaged brushless DC motor 10. The fusing type protector 100 comprising a temperature fuse wire 200 (in the figure, the temperature fuse wire is shown as projected out of the protector) and a fixed cover 300. The fixed cover 300 is provided with a groove 310 into which the temperature fuse wire 200 is received. In this way, the temperature fuse wire 200 is fixed on the motor casing 40 by the fixed cover 300.

When the stator is powered, the temperature of the motor is increased. In particular, the temperature increases more rapidly when the operating current is larger. The FET 52 in the Drive circuit 50 and the windings 14 of the motor generate great heat. The IC 51, FET 52, resistor and the like for driving has lower height and just form the depression(s) 42. Therefore, it is suitable to dispose the fusing type protector 100 at the depression(s) 42. As the fusing type protector 100 does not project outside the motor 10 after being mounted, the motor 10 as a whole appears simple and compact in structure.

Further, by using the fixed cover 300, the temperature fuse wire 200 can be accurately fixed on the motor casing 40 at a position where the temperature is highest. The groove 310 is so designed that the temperature fuse wire 200 inside the groove 310 is firmly fixed because there is no space for allowing the movement of the temperature fuse wire 200. Therefore, the temperature fuse wire 200 is prevented from moving due to poor positioning or loosening. As the temperature fuse wire 200 is positioned accurately and firmly without moving and can be operated normally.

Figure 5B:
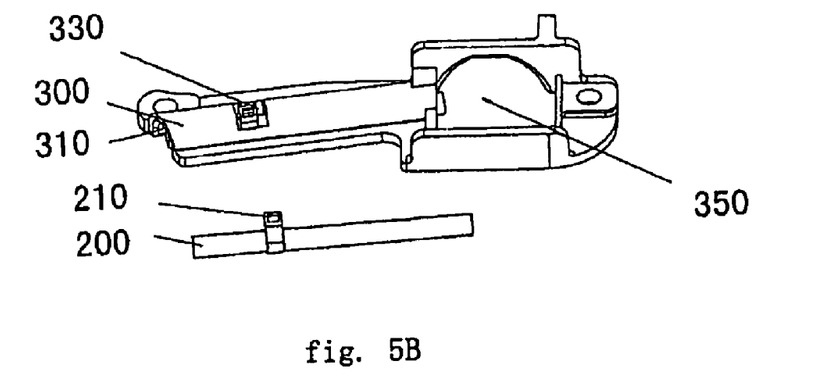
FIG. 5B is schematic view of a fixed cover of the fusing type protector according to the first embodiment of the present invention.

FIG. 5B is schematic view of a fixed cover of the fusing type protector according to the first embodiment of the present invention. As shown in FIG. 5B, an opening 330 is provided in the groove 310 of the fixed cover 300. The temperature fuse wire 200 is provided with a positioning device 210 for passing through the opening 330. In this way, the temperature fuse wire 200 can be fixed on the motor casing 40 accurately and quickly. The positioning device 210 serves to position the location of the temperature fuse wire 200. By this device, the temperature fuse wire 200 can be fixed on the motor casing 40 accurately and quickly at a position where the motor casing 40 has a highest temperature. The accuracy of the mounting position of the temperature fuse wire 200 is ensured and the mounting position can be determined externally. Furthermore, the man hour for assembling can be reduced.

Figure 5C:
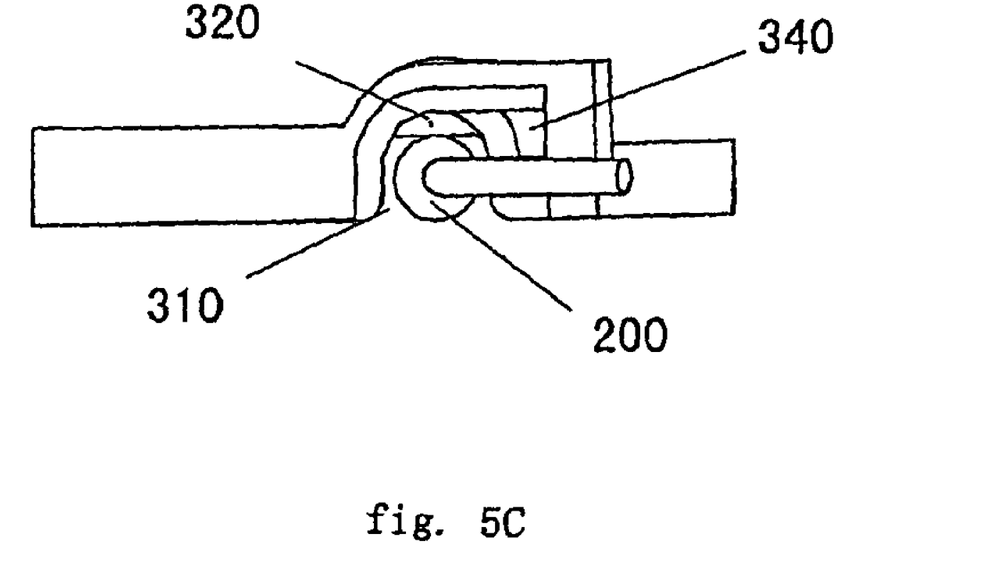
FIG. 5C is schematic view of another fixed cover of the fusing type protector according to the first embodiment of the present invention.

FIG. 5C is schematic view of another fixed cover of the fusing type protector according to the first embodiment of the present invention. A projection 320 is provided inside the groove 310, which abuts against the temperature fuse wire 200 to keep it in contact with the motor casing throughout. In this way, the temperature fuse wire 200 can quickly sense temperature.

Again, as shown in FIG. 5C, a wire outlet 340 of the groove 310 is expanded in the outward direction. The wire outlet 340 is expanded to allow the wire to be bent naturally, so that the wire will not break off easily. In this way, the safety of the wire is guaranteed, and the wire can be mounted conveniently.

Referring again to FIG. 5A, an opening hole 350 is provided at the side of the wire outlet 340 of the groove 310 to fit with the boss 41 on the motor casing. A second wire outlet 360 is provided at a side of the opening hole 350. As the present invention provides the opening hole 350 for fitting with the boss 41 on the motor casing, when the motor is mounted, the fixed cover 300 can be accurately mounted at a predetermined position by aligning the opening hole 350 with the boss 41 on the motor casing, so that the temperature fuse wire 200 can be mounted at desired positions and the assembly efficiency can be improved.

A strengthening rib 351 is provided beside the opening hole 351 for fitting with the boss 41 on the casing. The strengthening rib 351 serves to prevent the fixed cover 300 from breaking or deforming due to screwing on the fixed cover and thus increase the strength at the edge of the opening hole where a screw is formed.

The second wire outlet 360 is arc-shaped. Since the arc shape provides a much more space than a trapezoid shape, the wire can be bent naturally to the best advantage.

The wire is not easily to break off and has an improved stability due to the guide of the second wire outlet 360. A hook portion 361 is provided at the edge of the opening of the second wire outlet 360. The hook portion 361 serves as a clamping portion for the wire to allow the wire to be bent naturally toward a predetermined orientation, so that the wire is prevented from breaking due to unnaturally bending and the stability of the product can be guaranteed.

Figure 5D:
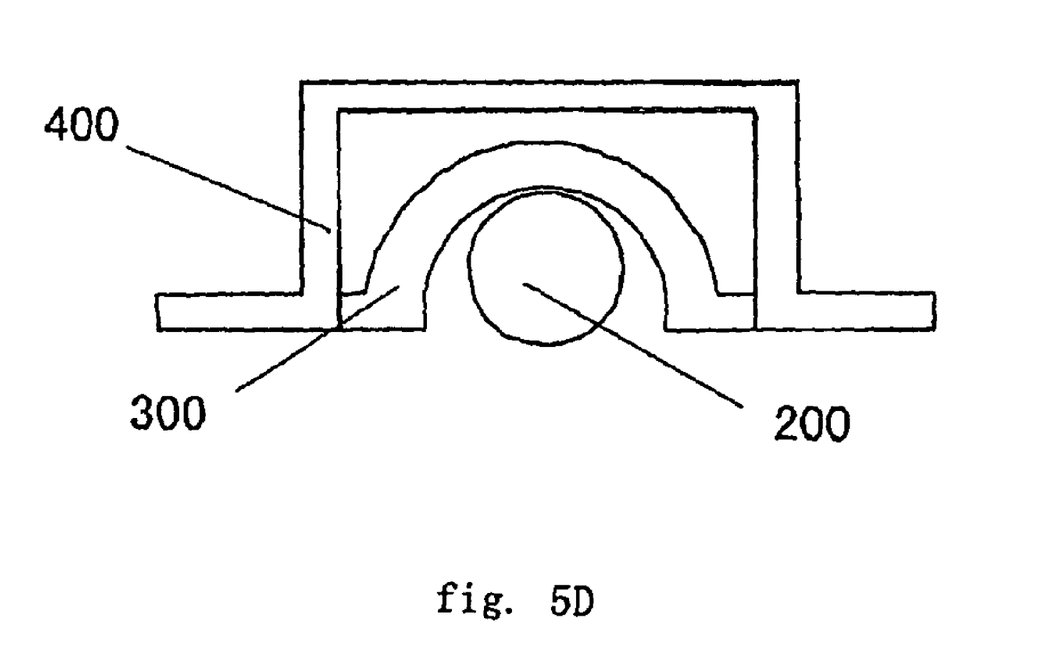
FIG. 5D is schematic view of a protection cover of the fusing type protector according to the first embodiment of the present invention.

FIG. 5D is schematic view of a protection cover of the fusing type protector according to the first embodiment of the present invention. A protection cover 400 is further provided outside the fixed cover 300. The protection cover 400 prevents heat loss effectively and allows the temperature fuse wire to sense temperature quickly.

Figure 6A:
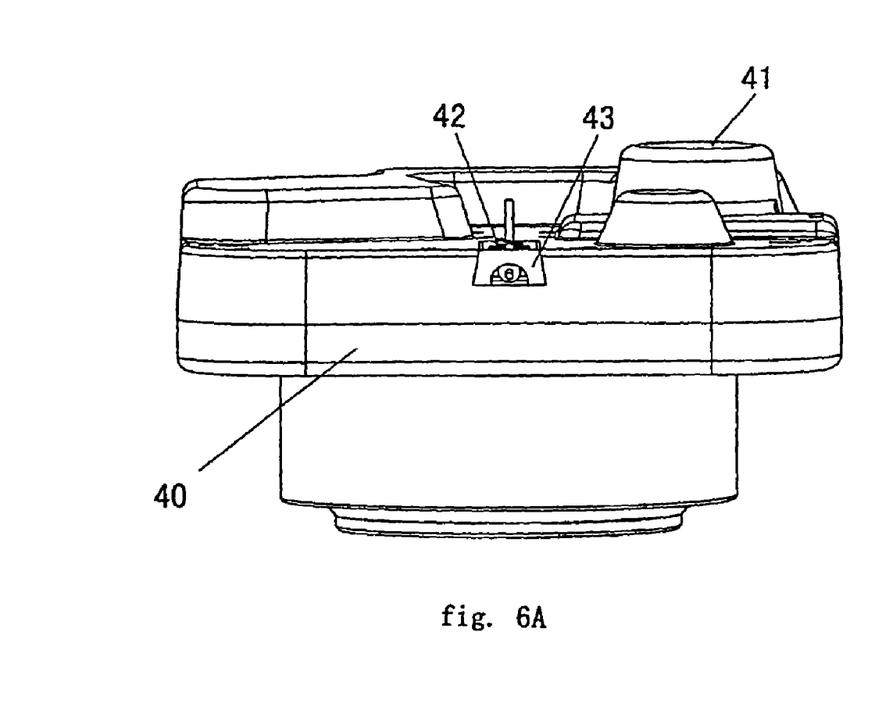
FIGS. 6A, 6B and 6C are schematic views of the fusing type protector according to the second embodiment of the present invention.
Figure 6B:
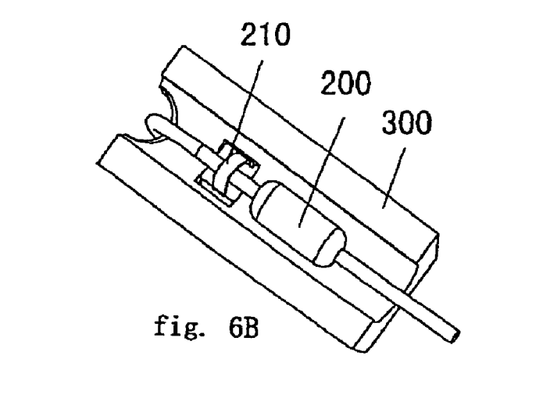
Figure 6C:
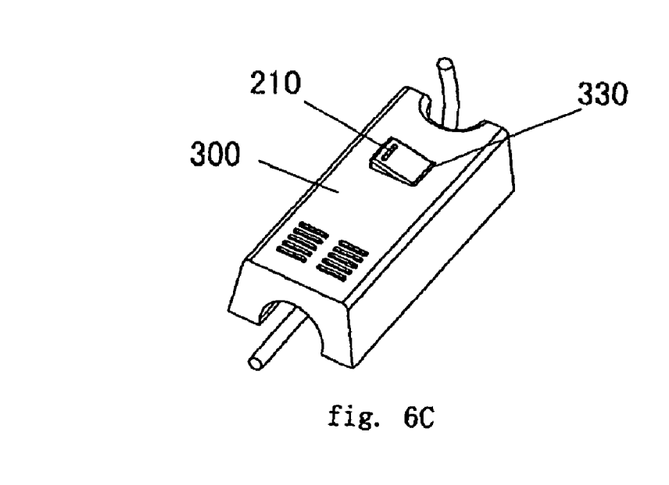

FIGS. 6A, 6B and 6C are schematic views of the fusing type protector according to the second embodiment of the present invention. The second embodiment is different from the first embodiment in that a recess 43 is formed in the depression 42 and the fixed cover 300 fitted with the temperature fuse wire 200 is embedded into the recess 43. The recess 43 is so designed that the fixed cover 300 can clamp on the motor casing directly, so that the operation thereof is easily and the man hour reduced.

The temperature fuse wire 200 is provided with a positioning device 210. The fixed cover 300 is provided with an opening 330. The positioning device 210 passes through the opening 330 to secure the temperature fuse wire 200 on the motor casing 40. The positioning device 210 of the temperature fuse wire 200 serves to position the location of the temperature fuse wire 200. With such arrangement, the temperature fuse wire 200 can be fixed on the motor casing 40 accurately and quickly at a position where the casing temperature is highest. Therefore, while the accuracy of the mounting position of the temperature fuse wire 200 is guaranteed, the mounting position can be determined externally and the man hour for assembling the motor can be reduced.

Figure 7:
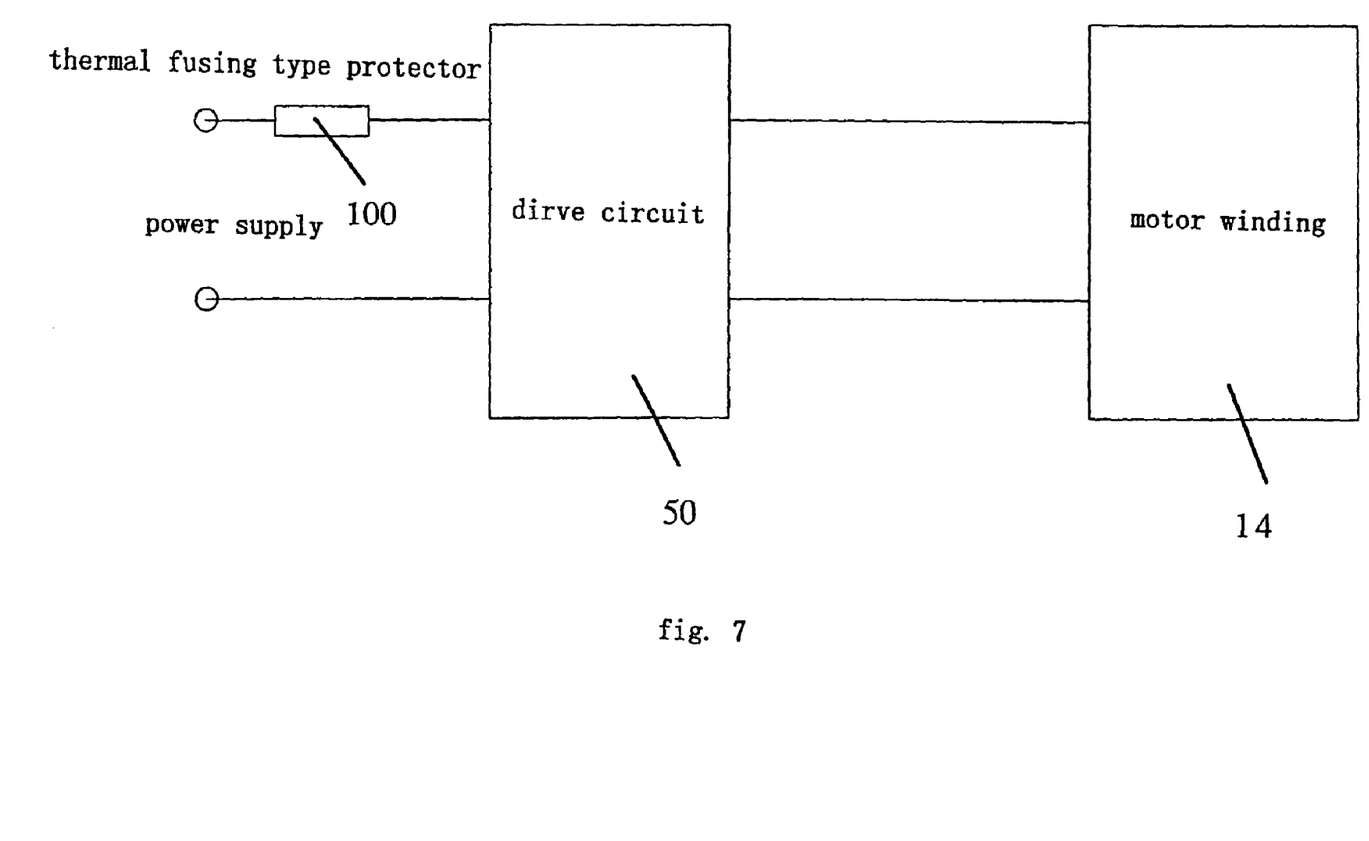
FIG. 7 is a schematic view of the drive circuit of the thermal fusing type protector according to the first embodiment of the present invention.

As shown in FIG. 7, in the circuit of the brushless DC motor, the thermal fusing type protector 100 is connected in series outside the drive circuit 50 and the motor winding 14. When the thermal fusing type protector 100 is fused, the power supply to both the thermal fusing type protector 100 and the motor winding 14 is turned off concurrently. In comparison to the prior art, the thermal fusing type protector 100 of the present invention can turn off the power supply to both the thermal fusing type protector 100 and the motor winding 14 concurrently, so the whole brushless DC motor is placed into a power off condition, and the stability of the product can be guaranteed.

Further, in the circuit of the brushless DC motor of the present invention, there is provided a temperature protection module. When an abnormal variation in temperature of the motor is detected, the thermal fusing type protector 100 can turn off the power supply to the motor winding 14 and the drive circuit 50. Since the thermal fusing type protector 100 can sense the abnormal variation in temperature of the motor winding 14 and the drive circuit 50 during operating, the power supply to the motor winding 14 and the drive circuit 50 can be turned off. Therefore, whether the motor winding 14 or the drive circuit 50 encounters a malfunction, the power supply can be turned off, so the stability of the product can be guaranteed.

Furthermore, in the circuit of the brushless DC motor of the present invention, there is provided a function module for detecting the number of revolutions. When the brushless DC motor is in a locked state or idling without a fan, the power output to the motor winding 14 from the drive circuit 50 is reduced, so that the temperature raise of the motor winding 14 is suppressed, and the temperature fuse wire will not break up.

The motor in the prior art will encounter a temperature increase when it is in a locked state or idling without a fan, so that the thermal fusing type protector works and the motor shall not work. At this time, if the user wants to use the product again, he must replace the motor. However, according to the present invention, when the above condition occurs, although the temperature of the brushless DC motor is increased, the temperature is controlled within the temperature that the thermal fusing type protector 100 works, so that the brushless DC motor will not be damaged and can work normally after the trouble or accident is eliminated. When the motor is in malfunction, the thermal fusing type protector 100 is started as the final protection means, so the convenience of the operation can be improved. The brushless DC motor is stable and reliable and the loss of user can be reduced.

Figure 8:
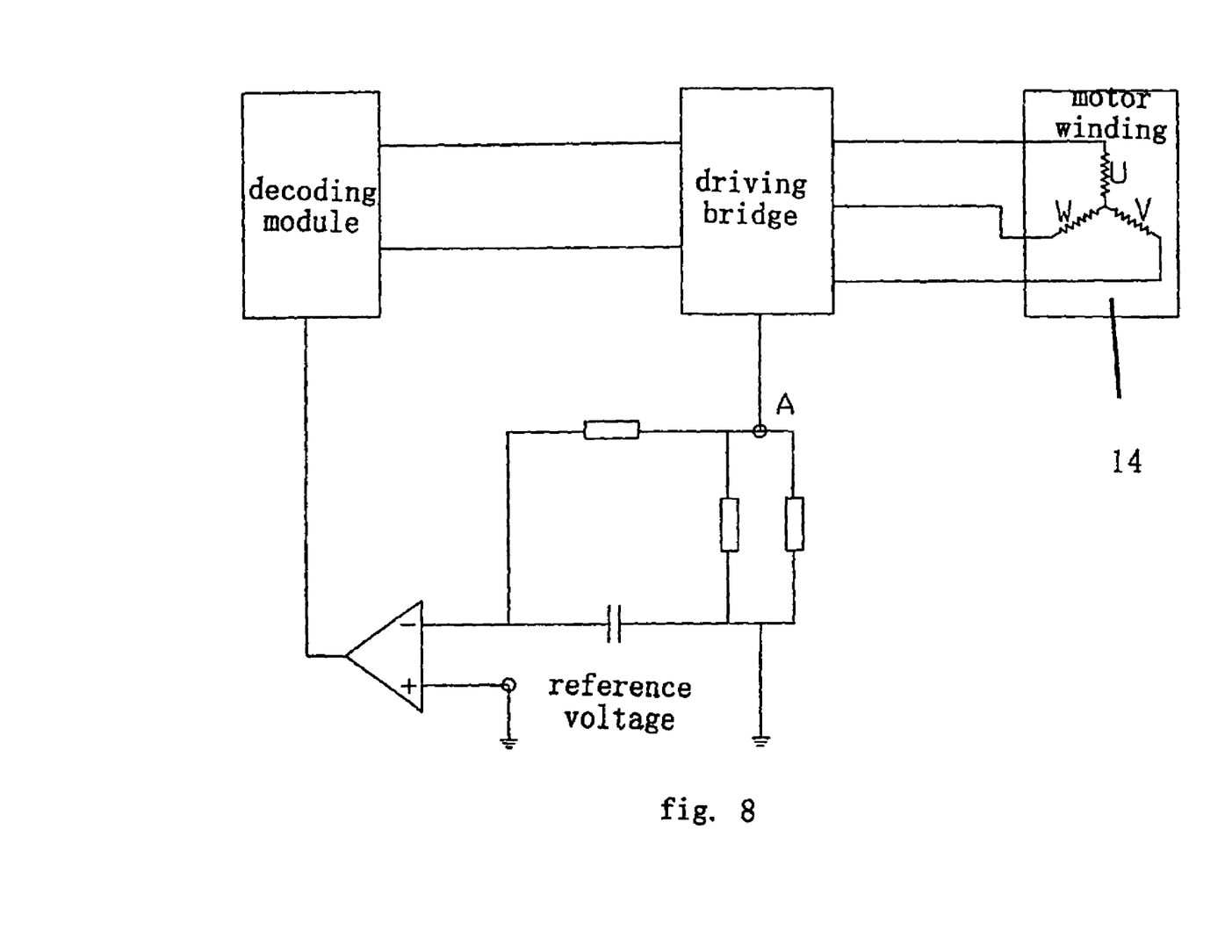
FIG. 8 is a schematic view of the circuit detection module and the voltage detection module for the motor according to the first embodiment of the present invention.

In the circuit of the brushless DC motor of the present invention, a current detection module for detecting the current of the motor winding 14 and a voltage detection module for detecting the voltage of the motor winding 14 are provided. As shown in FIG. 8, the voltage at point A is sampled. When the load of the motor is increased, such as in the case when the motor is in a locked state or idling without a fan, the current is increased and the voltage at A point is increased accordingly. When the motor is overloaded or blocked, the current will become much larger. When the voltage at A point is equal to or greater than the reference voltage of the voltage comparator, the comparator outputs feedback signal to the control terminal to reduce the output duty ratio, so that the effective voltage of the motor winding will be reduced.

The temperature increase of the motor winding can be reduced by reducing the power output to the motor winding from the drive circuit, so that the thermal fusing protector 100 shall not break up.

What is claimed is:

1. A brushless DC motor including a temperature protection device comprising:
   a motor;
   a drive circuit positioned on a substrate;
   a casing having a top surface and covering the motor and the drive circuit; and
   a thermal fusing type protector provided in a depression formed on the top surface of the casing, wherein the depression is at a position where an element in the drive circuit on the substrate, including a driving IC and a, FET, which have a lower height, are positioned, such that the thermal fusing type protector is in thermal communication with the drive circuit;
   wherein the thermal fusing type protector comprises a temperature fuse wire and a fixed cover, the fixed cover having a groove in the center thereof, the temperature fuse wire is received in the grove, the temperature fuse wire is fixed on the casing of the motor via the fixed cover.

2. The brushless DC motor according to claim 1, wherein the depression is provided above the driving IC in the drive circuit, the driving IC is an element that generates most heat.

3. The brushless DC motor according to claim 1, wherein the thermal fusing type protector in the circuit of the brushless DC motor is connected to the power supply to both the drive circuit and the motor winding, and when the thermal fusing type protector is fused, the power supply to both the drive circuit and the motor winding is turned off.

4. The brushless DC motor according to claim 1, wherein a temperature protection module is provided in the circuit of the brushless DC motor, and when the thermal fusing type protector detects an abnormal variation in the temperature of the motor, the power supply to both the motor winding and the drive circuit is turned off.

5. The brushless DC motor according to claim 1, wherein a function module for detecting the number of revolutions is provided in the circuit of the brushless DC motor, and when the brushless DC motor is in a locked state or idling without a fan, the power output to the motor winding from the drive circuit is reduced to restrain the increase in temperature of the motor winding for preventing the thermal fusing type protector from turning off.

6. The brushless DC motor according to claim 1, wherein a circuit detection module for detecting the current in the motor winding and a voltage detection module for detecting the voltage of the voltage of the motor winding are provided in the circuit of the brushless DC motor, and when the motor is in a locked state or idling without a fan, the power output to the motor winding from the drive circuit is reduced to restrain the increase in temperature of the motor winding for preventing the thermal fusing type protector from turning off.

7. A brushless DC motor including a temperature protection device comprising:
   a motor;
   a drive circuit positioned on a substrate;
   a casing having a top surface and covering the motor and the drive circuit; and
   a thermal fusing type protector provided in a depression formed on the top surface of the casing,
      wherein the thermal fusing type protector comprises a temperature fuse wire and a fixed cover, the fixed cover having a groove in the center thereof, the temperature fuse wire is received in the groove, the temperature fuse wire is fixed on the casing of the motor via the fixed cover, and wherein a projection is formed in the groove of the fixed cover for abutting against the temperature fuse wire to keep it in contact with the casing of the motor throughout.

8. A brushless DC motor including a temperature protection device comprising:
   a motor;
   a drive circuit positioned on a substrate;
   a casing having a top surface and covering the motor and the drive circuit; and
   a thermal fusing type protector provided in a depression formed on the top surface of the casing,
      wherein the thermal fusing type protector comprises a temperature fuse wire and a fixed cover, the fixed cover having a groove in the center thereof, the temperature fuse wire is received in the groove, the temperature fuse wire is fixed on the casing of the motor via the fixed cover; and
      wherein an opening is formed in the groove of the fixed cover, and the fuse wire is provided with a positioning device passing through the opening.

9. The brushless DC motor according to claim 7, or 8, wherein a wire outlet of the groove is expanded in the outward direction.

10. The brushless DC motor according to claim 9, wherein an opening hole is provided at the side of the wire outlet of the groove for fitting with a boss on the casing of the motor, and a second wire outlet is provided at a side of the opening hole.

11. The brushless DC motor according to claim 10, wherein a strengthening rib is provided besides the opening hole for fitting with the boss on the casing of the motor.

12. The brushless DC motor according to claim 10, wherein the second wire outlet is arc-shaped.

13. The brushless DC motor according to claim 10, wherein a hook portion is provided at the edge of the opening of the second wire outlet.

14. The brushless DC motor according to claim 13, wherein a protection cover is provided on the fixed cover.

15. A brushless DC motor including a temperature protection device comprising:
   a motor;
   a drive circuit positioned on a substrate;
   a casing having a top surface and covering the motor and the drive circuit; and
   a thermal fusing type protector provided in a depression formed on the top surface of the casing,
      wherein a recess is formed at the depression, and the thermal fusing type protector comprises a temperature fuse wire and a fixed cover, the fixed cover fitted with the fuse wire is embedded into the recess; and
      wherein an opening is provided in a groove of the fixed cover, and a positioning device is provided at an outer layer of the temperature fuse wire, the positioning device passing through the opening for fixing the temperature fuse wire on the casing of the motor.

16. The brushless DC motor according to claim 15, wherein a protection cover is provided on the fixed cover.

* * * * *